W. A. SCOTT.
OVEN FOR COOKING STOVES AND FURNACES.
APPLICATION FILED APR. 4, 1912.
1,043,632.
Patented Nov. 5, 1912.
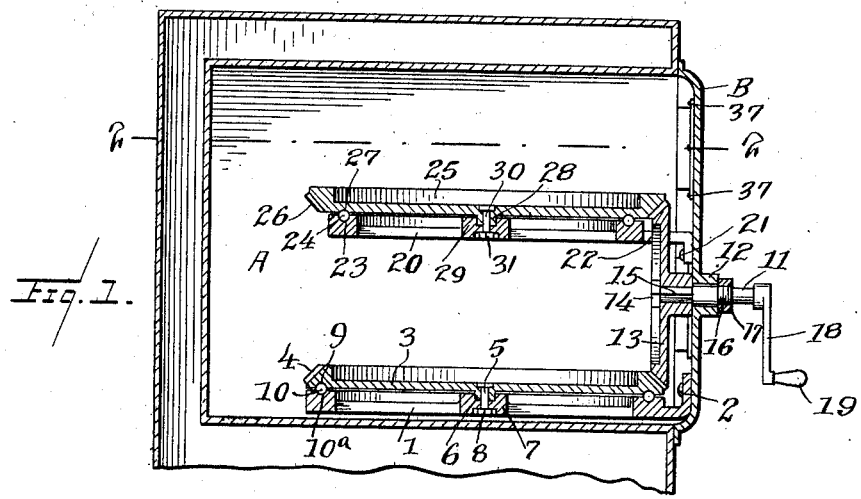
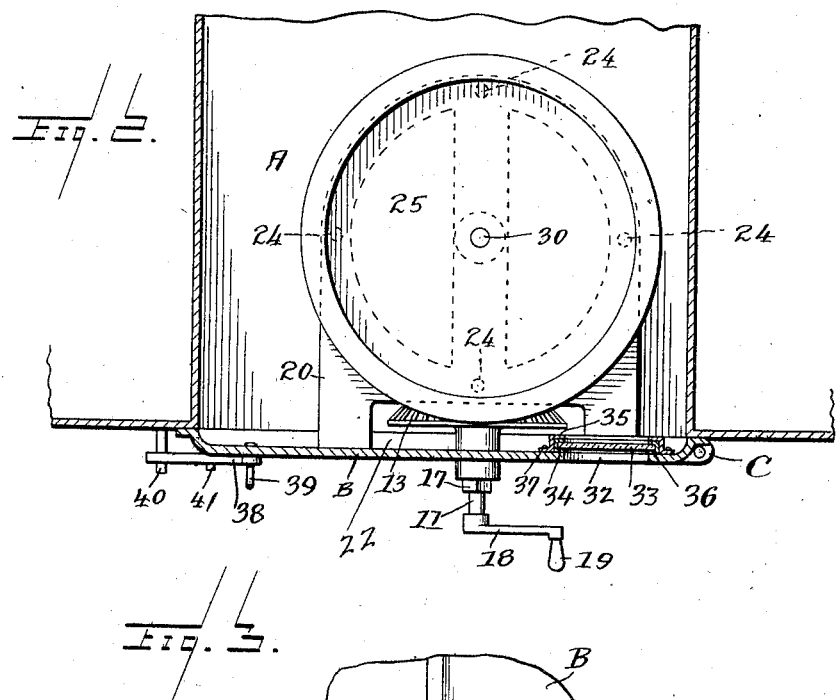
Witnesses
E. P. Ruppert
J. W. Garner
Inventor
William A. Scott
By Victor J. Evans
Attorney

UNITED STATES PATENT OFFICE.

WILLIAM A. SCOTT, OF OCALA, FLORIDA, ASSIGNOR OF ONE-HALF TO DAVID D. SILVA, OF CAPE SAN BLASS, FLORIDA.

OVEN FOR COOKING-STOVES AND FURNACES.

1,043,632. Specification of Letters Patent. Patented Nov. 5, 1912.

Application filed April 4, 1912. Serial No. 688,481.

*To all whom it may concern:*

Be it known that I, WILLIAM A. SCOTT, a citizen of the United States, residing at Ocala, in the county of Marion and State of Florida, have invented new and useful Improvements in Ovens for Cooking-Stoves and Furnaces, of which the following is a specification.

This invention relates to improvements in cooking stoves and furnaces and especially with reference to the ovens thereof, the object of my invention being to provide improved devices connected to and carried by and movable with an oven door, whereby bread or other material to be baked may be put into and taken out of the oven by simply closing and opening the oven door and may, when in the oven, be turned as may be required to cause it to bake evenly at all times thus entirely relieving the cook of the necessity of placing his hands in the oven either for putting in or taking out the articles in the oven, the invention consisting in the construction, combination and arrangement of devices hereinafter described and claimed.

In the accompanying drawing:—Figure 1 is a vertical sectional view of a portion of the oven of an ordinary cook stove provided with my improved baking devices. Fig. 2 is a horizontal sectional view of the same on the plane indicated by the line 2—2 of Fig. 1. Fig. 3 is a detail elevation of a portion of the oven door, showing the latch therefor.

For the purposes of this specification, there is shown in Figs. 1 and 2 of the drawing, a portion of the oven A of an ordinary cook stove, the door being indicated at B and this door being, as is usual, hinged at one side as at C so that it may be readily opened and closed.

In accordance with my invention, I provide a bracket or support 1 which projects from the inner side of the oven door at a point slightly above the bottom of the oven so that when the door is opened the support 1 is taken out of the oven and when the door is closed the said support is arranged in the oven and immediately above the bottom thereof. This support may be of any suitable construction and is here shown as secured to the oven door as at 2. On the upper side of the support is a lower carrier 3. This carrier is circular in form and is arranged for rotation on the support and in the oven. The carrier is provided with peripherally beveled cogs 4 which extend upwardly from and around the bottom of the carrier so that in effect the carrier forms a pan or platform on which a baking pan may be placed or on which articles to be baked may be directly placed when it is not desired or necessary to employ a baking pan. Within the scope of my invention, any suitable means may be employed for mounting this carrier. For the purposes of this specification, I show the carrier as provided with a centrally arranged pivot axis 5 which, in practice, may be a bolt which extends through a central stud 6 that projects from the lower side of the revoluble carrier. This stud is here shown as mounted in a bearing 7 with which the support is provided, the said stud being countersunk in the bearing and I also show a nut 8 screwed to the lower end of the bolt and arranged in a countersink in the lower side of the support so that the lower ends of the bolt and nut are flush with the lower side of the support and do not interfere with the movement of the device in and out of the oven when the door is opened and closed. The revoluble carrier is also shown as constructed with an annular groove 9 in its lower side which is engaged by bearing balls 10. Preferably only four of these bearing balls are employed, arranged at 90° apart and each located in a recess 10$^a$ in the upper side of the support. Any suitable means may be employed for mounting the revoluble carrier and reducing the friction thereof and I would have it understood that I am not limited in this particular. I also provide an operating shaft 11 which is arranged horizontally and is mounted in a bearing 12 with which the oven door is provided. On the inner end of this shaft and arranged on the inner side of the oven door is a beveled pinion 13 which engages the beveled gear of the revoluble carrier. This pinion may be secured on the shaft in any suitable manner and by any suitable means. It is here shown as secured by a nut 14, the shaft being shown as provided with a cross sectionally rectangular stud 15 which fits in a correspondingly shaped central opening in the pinion. The outer end portion of the shaft is shown as reduced in diameter and having a threaded portion 16 which is engaged by a nut 17 that bears against the outer side of the bearing 12 so that the shaft is held in place by the nut and also by the hub of the pinion. To the outer end of the shaft is secured a suitable crank 18 which has a handle 19 whereby the shaft may be rotated from the outer side of the oven door so as to cause the pinion 13 to rotate the revoluble carrier which is within the oven when the door is closed. Hence, the carrier may be turned as may be required to prevent bread or other articles from burning and to cause the same to bake evenly at all points, and this may be done without the necessity of opening the door and also without the necessity of the cook placing his hand in the oven.

A supporting bracket 20 is arranged at a suitable height above the carrier 3 and is here shown as secured to the inner side of the oven door as at 21. This supporting bracket has an opening 22 through which the upper side of the pinion 13 extends and is substantially identical in construction with the support 1, being provided at points 90° apart on its upper side, with recesses 23 in which bearing balls 24 are placed. An upper carrier 25 which is substantially identical in construction with the lower carrier 3, but which has its beveled cogs 26 on its under side and engaged with the upper side of the pinion is mounted for rotation on the supporting bracket, being provided in its under side with a circular groove 27 which is engaged by the bearing balls 24. On the under side of the upper carrier at the center thereof is a stud 28 which is countersunk in a bearing 29 with which the supporting bracket 20 is provided, the pivot or axis of the upper carrier being here shown as formed by a bolt which extends through a central opening in the upper carrier and the bearing, has its head countersunk in the bottom of the carrier and is provided at its lower end with a nut 31 which is countersunk in the lower side of the bearing.

It will be understood that the upper carrier is revolved simultaneously with the lower carrier by the pinion when the latter is turned by the crank and that the upper carrier revolves in the reverse direction to the lower carrier. The upper carrier also forms in effect a pan or platform on which a baking pan may be placed or on which articles to be baked may be directly placed when it is not desired or necessary to employ a baking pan and by the provision of the upper carrier as well as the lower carrier it will be noted that bread or the like may be baked either in the lower or upper portion of the oven.

To enable the cook to ascertain the condition of the article or articles baking in the oven, the door is provided with an opening 32, one or more, at any suitable point which opening is covered by a pane of glass or other transparent material 33, the glass pane being held in a groove 34 in a frame 35 and between asbestos strips 36 so that the glass is protected from excessive heat and from being detachably secured in the oven door by means of bolts 37.

In order to secure the door in closed position, I provide the door with a pivot catch 38. The pivot axis of this catch is extended on the outer side of the door and is provided with a suitable handle 39 whereby the catch may be raised and lowered. This catch engages a keeper 40 on one side of the door frame and when the door is open is prevented from dropping too far by means of a stop stud 41 which projects from the outer side of the door.

It will be understood that it is not necessary to raise the oven door before opening it and all that is required is to partly turn the catch so as to cause the catch to rise a sufficient distance to become disengaged from the keeper.

While I have herein shown and described a preferred form of my invention, I would have it understood that changes may be made in the form, proportion and construction of the several parts without departing from the spirit of my invention and within the scope of the appended claims.

I claim:—

1. An oven door having a support extending from its inner side, a revoluble carrier mounted on the support and having a gear, and a shaft mounted in the door and having a gear at its inner end engaging the gear of the carrier, the said shaft being provided at its outer end, on the outer side of the door with means whereby said shaft may be turned to cause the carrier to be revolved.

2. An oven having a door provided on its inner side with a lower support and an upper support, a revoluble carrier mounted on each of the supports, and means carried by the door to revolve the said upper and lower carriers.

3. An oven door having a lower support extending from its inner side, a lower revoluble carrier mounted on the lower support and having a gear, an upper support also extending from the inner side of the door, an upper revoluble carrier mounted on the upper support and having a gear, and a shaft mounted in the door and having a gear at its inner end engaging the gears of the carriers, the said shaft being provided at its outer end on the outer side of the door with means whereby said shaft may be turned to cause the carriers to be revolved.

In testimony whereof I affix my signature in presence of two witnesses.

WILLIAM A. SCOTT.

Witnesses:
J. P. GALLOWAY,
S. Q. SISTRUNK.